United States Patent
Seki et al.

(10) Patent No.: US 9,514,552 B2
(45) Date of Patent: Dec. 6, 2016

(54) INFORMATION PROCESSING APPARATUS, INFORMATION PROCESSING METHOD, AND STORAGE MEDIUM

(71) Applicant: NEC Corporation, Tokyo (JP)

(72) Inventors: Keiichi Seki, Tokyo (JP); Kiyoto Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 77 days.

(21) Appl. No.: 14/669,004

(22) Filed: Mar. 26, 2015

(65) Prior Publication Data

US 2015/0279068 A1 Oct. 1, 2015

(30) Foreign Application Priority Data

Mar. 26, 2014 (JP) .................. 2014-062921

(51) Int. Cl.
- G06T 11/20 (2006.01)
- G06F 3/033 (2013.01)
- G06F 3/02 (2006.01)
- G06F 3/038 (2013.01)
- G06F 3/041 (2006.01)
- G06F 3/0484 (2013.01)

(52) U.S. Cl.
CPC ............... G06T 11/20 (2013.01); G06F 3/02 (2013.01); G06F 3/033 (2013.01); G06F 3/038 (2013.01); G06F 3/0416 (2013.01); G06F 3/0484 (2013.01); *G06F 2203/0381* (2013.01)

(58) Field of Classification Search
CPC .......... G06T 11/20; G06F 3/002; G06F 3/033; G06F 3/038; G06F 3/0416; G06F 3/0488; G06F 3/0484
See application file for complete search history.

(56) References Cited

U.S. PATENT DOCUMENTS

| 2004/0257385 A1* | 12/2004 | Kim | ...... G06F 1/1613 345/649 |
| 2005/0038982 A1* | 2/2005 | Park | ...... G06F 1/162 713/1 |

FOREIGN PATENT DOCUMENTS

| JP | 5107453 | 12/2012 |
| JP | 5172997 | 3/2013 |

OTHER PUBLICATIONS http://www.atmarkit.co.jp/ait/articles/1301/28/news068.html.

* cited by examiner

*Primary Examiner* — Todd Buttram
(74) *Attorney, Agent, or Firm* — Young & Thompson

(57) ABSTRACT

Disclosed are an information processing apparatus etc., which can display an operation object while switching according to an operation unit that is operated by a function that is in operation, includes a conversion unit that, when a switch from an operation performed by a first function which detects an operation performed by a first operation unit to an operation performed by a second function which detects an operation performed by a second operation unit, converts a description regarding an operation object related to the first operation unit in at least one description to display on a display unit that operates by the first function into a description regarding the operation object related to the second operation unit, and a drawing unit that displays the description obtained by conversion performed by the conversion unit on a display unit that operates by the second function.

10 Claims, 20 Drawing Sheets

Fig. 3

| OCCURRENCE TIME | EVENT TYPE | INVENT TYPE-DEPENDENT DATA | |
|---|---|---|---|
| | | X LOCATION | Y LOCATION |
| 2013.12.13 11:43 41.378 | POINTING DEVICE | 40 | 40 |
| 2013.12.13 11:43 41.380 | POINTING DEVICE | 50 | 52 |
| | | | |

Fig. 10

| NOTEBOOK PC | TABLET TERMINAL |
|---|---|
| dijit/form/ComboBox | dijit/form/DrumRoll |
| dijit/form/NumberSpinner | dijit/form/DrumRoll |

Fig. 11

| NOTEBOOK PC | TABLET TERMINAL |
|---|---|
| BUTTON SIZE: 10x30 PIXELS | BUTTON SIZE: 40x40 PIXELS |
| ANCHOR INTERVAL: 10 PIXELS | ANCHOR INTERVAL: 40 PIXELS |

Fig. 16

| OCCURRENCE TIME | EVENT TYPE | EVENT TYPE-DEPENDENT DATA | |
|---|---|---|---|
| 2013.12.13 11:53 51.270 | KEY EVENT | – | – |
| 2013.12.13 11:53 51.680 | KEY EVENT | – | – |
| | | | |

INFORMATION PROCESSING APPARATUS, INFORMATION PROCESSING METHOD, AND STORAGE MEDIUM

This application is based upon and claims the benefit of priority from Japanese Patent Application No. 2014-062921, filed on Mar. 26, 2014, the disclosure of which is incorporated herein in its entirety by reference.

TECHNICAL FIELD

The present invention relates to a user interface technology in an information processing apparatus equipped with an operation unit.

BACKGROUND ART

In recent years, smart devices (i.e., tablet terminals and smartphones) as well as desktop type personal computers (PCs) and notebook type PCs have been used as terminals (web clients) that enable users to browse information acquired over the Internet. The smart devices are generally different from the desktop type PCs and the notebook type PCs in screen size and an operating method, and therefore require technologies for displaying optimum screen pictures for individual types of smart devices. As such a technology, for example, a technique termed the Responsive Web Design disclosed at http://www.atmarkit.co.jp/ait/articles/1301/28/news068.html (searched on Mar. 20, 2014) has been developed. The Responsive Web Design changes a picture in terms of displaying layout, image size and character size in accordance with the size of the screen (particularly the horizontal width of the screen).

Meanwhile, there has also been developed a notebook type PC (hereinafter, referred to as "notebook PC") which causes, when used in an ordinary state of a notebook PC, the functions of a notebook PC to operate and whose liquid crystal screen unit causes, when detached or folded, the functions of a tablet terminal to operate (this type of notebook PC is generally called hybrid notebook PC).

Generally, a user of a hybrid notebook PC uses the user's own fingers as a pointing device when the tablet terminal functions are in operation, and uses a mouse or a trackpad as a pointing device when the notebook PC functions are in operation. Users of tablet terminals often utilize the enlargement and reduction functions (pinch-out and pinch-in functions) performed by using their own fingers or the like, and users of notebook PCs often utilize the scroll function that is carried out by using a mouse or the like to display a desired portion on a screen. In short, the tablet terminal and the notebook PC are different from each other in terms of appropriate operation units. Therefore, in the hybrid notebook PC on which the operation units of both the tablet terminal and the notebook PC are available, it is desirable to provide appropriate operation units according to the state of use of the hybrid notebook PC.

In the meantime, there exist various browser software products that allow the browsing of web sites, including open source software (OSS) applications, products developed by commercial venders, and the like. These software products have individually gained certain amounts of market shares. Therefore, it is now a common practice for administrators and the like that construct web sites to construct a web site so that the web site is usable substantially equally via a plurality of browsers.

Furthermore, it is also a common practice to construct a web site so that not only the pre-determined contents, such as characters, images, moving video pictures, and the like, are displayed, but also the display contents are dynamically altered by using a programming language called JavaScript (registered trademark). JavaScript is executed by a JavaScript engine that is contained in a web browser. In other words, JavaScript is executed in a web browser. Therefore, the operation of JavaScript is restricted to a certain extent by the web browser. In addition, it is generally difficult to obtain information about devices such as a keyboard and a mouse without depending on the browser.

For example, Japanese Patent No. 5107453 discloses an information processing apparatus that is equipped with an input unit and a display unit. This information processing apparatus accomplishes excellent operability by displaying objects so that the objects can be selected and each object can be partially selected.

Furthermore, Japanese Patent No. 5172997 discloses an information processing apparatus that allows a user to cause the apparatus to perform a series of processes, including selection of an object, determination, display of resulting structures (relevant items), selection of a resulting structure, and display of a final resulting structure, by carrying out simple and easy contact actions, a reduced number of actions, and intuitive contact actions.

SUMMARY

The present invention has been made in view of the foregoing problems, and it is a main object of the invention to provide an information processing apparatus equipped with two or more functions that are operated by different operation units, the information processing apparatus being capable of displaying an operation object while switching according to one of the operation units that is operated by a function that is in operation.

An information processing apparatus according to an exemplary aspect of the invention includes a conversion unit that, when a switch from an operation performed by a first function which detects an operation performed by a first operation unit to an operation performed by a second function which detects an operation performed by a second operation unit, converts a description regarding an operation object related to the first operation unit in at least one description to display on a display unit that operates by the first function into a description regarding the operation object related to the second operation unit, and a drawing unit that displays the description obtained by conversion performed by the conversion unit on a display unit that operates by the second function.

An information processing method according to an exemplary aspect of the invention includes converting, when a switch from an operation performed by a first function which detects an operation performed by a first operation unit to an operation performed by a second function of detecting an operation performed by a second operation unit, a description regarding an operation object related to the first operation unit in at least one description to display on a display unit that operates by the first function into a description regarding the operation object related to the second operation unit, and displaying the description obtained by the conversion on a display unit that operates by the second function.

Further, the object is also achieved by a computer program which realizes by the information processing apparatus or the information processing method including individual configurations mentioned above, and a computer readable storage medium in which the computer program is stored.

The present invention achieves an advantageous effect of enabling an information processing apparatus equipped with two or more functions that operated by different operation units to display an operation object while switching according to an operation unit that is operated by a function that is in operation.

BRIEF DESCRIPTION OF THE DRAWINGS

Exemplary features and advantages of the present invention will become apparent from the following detailed description when taken with the accompanying drawings in which:

FIG. 3 is a diagram illustrating an example of event information that is stored in the client in accordance with the first exemplary embodiment of the present invention, FIG. 10 is a diagram presenting a screen component relational table stored in the client in accordance with the first exemplary embodiment of the present invention, FIG. 11 is a diagram presenting a button size relational table stored in the client in accordance with the first exemplary embodiment of the present invention, FIG. 16 is a diagram illustrating event information stored in the client in accordance with the second exemplary embodiment of the present invention.

EXEMPLARY EMBODIMENT

Hereinafter, exemplary embodiments of the present invention will be described in detail with reference to the accompanying drawings.

First Exemplary Embodiment

Figure 1:
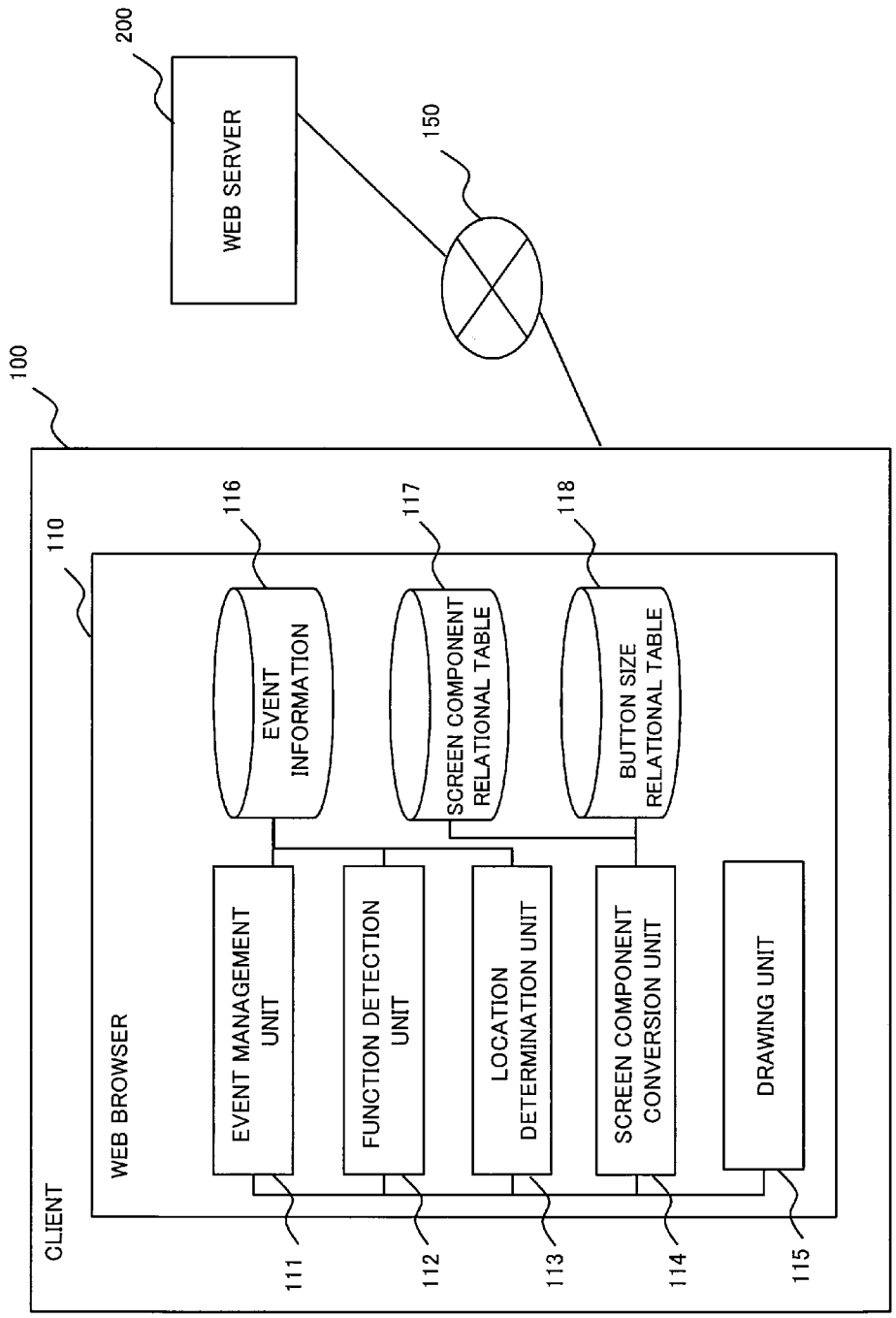
FIG. 1 is a block diagram illustrating a construction of a client in accordance with a first exemplary embodiment of the present invention.

FIG. 1 is a block diagram illustrating a construction of a client 100 in accordance with a first exemplary embodiment of the present invention. As illustrated in FIG. 1, the client 100 is capable of communicating with a web server 200 via a communication network 150.

The client 100 is a web client capable of browsing information acquired from the web server 200 via the communication network 150. The client 100 is also a hybrid notebook PC that functions as a notebook PC and also functions as a tablet terminal, for example, when a liquid crystal screen of the client 100 is folded to or detached from the rest of the client 100. In the description below, an incident in which the client 100 functions as a notebook PC will be described also as an incident in which the "notebook PC function operates", and an incident in which the client 100 functions as a tablet terminal will be described also as an incident in which the "tablet terminal function operates".

The client 100 executes a web browser 110 that provides a user with the information acquired from the web server 200. The web browser 110 includes an event management unit 111, a function detection unit (determination unit) 112, a location determination unit (determination unit) 113, a screen component conversion unit 114, a drawing unit 115, an event information storage unit 116, a screen component relational table storage unit 117, and a button size relational table storage unit 118.

The event management unit 111 detects an event (operation) that is input to the client 100 from an operation unit that includes an input device such as a pointing device, a keyboard, or the like (not illustrated), and stores event information about the detected event into the event information storage unit 116. The function detection unit 112 detects whether, in the client 100, the notebook PC function is operating or the tablet terminal function is operating. The location determination unit 113 determines a location at which the client 100, when switched in operation mode, starts conversion regarding a description for displaying a component (object) that becomes an operation object of an operation unit after the switching in operation mode. The operation mode means a mode in which the notebook PC function operates in the client 100 or a mode in which the tablet terminal function operates in the client 100.

The screen component conversion unit 114 converts a description (program code) contained in a HyperText Markup Language (HTML) document that, according to the aforementioned operation mode switching, displays a component that becomes an operation object of the operation unit after the switching in operation mode. The drawing unit 115 analyzes the HTML document (content) acquired from the web server 200 via the communication network 150, and draws a screen image according to the HTML document. The drawing unit 115 also draws a screen image according to the HTML document that has been converted by the screen component conversion unit 114.

The event information storage unit 116 stores event information about an event that is input via the operation unit. The screen component relational table storage unit 117 stores a screen component relational table regarding a description that displays a component whose displayed form is converted, according to the operation mode switching of the client 100. The button size relational table storage unit 118 stores a size relational table regarding the sizes of components whose displayed forms are converted, similarly according to the operation mode switching of the client 100. The event information storage unit 116, the screen component relational table storage unit 117, and the button size relational table storage unit 118 may be realized by a main storage device, or may also be realized by a web storage or the like according to the HTML5 technology.

In the client 100, operation units that operate when the tablet terminal function is operating are different from operation units that operate when the notebook PC function is operating. Therefore, at the timing at which the operation mode is switched, the client 100 switches the screen display to a screen display that is suitable to reception (detection) of an operation (event) from the operation unit that operates due to the function activated after the switching in operation mode. In this exemplary embodiment, the operation unit used when the tablet terminal function is operating in the client 100 is assumed to be fingers or a stylus pen, and the operation unit used when the notebook PC function is operating in the client 100 is assumed to be a mouse.

Figure 2:
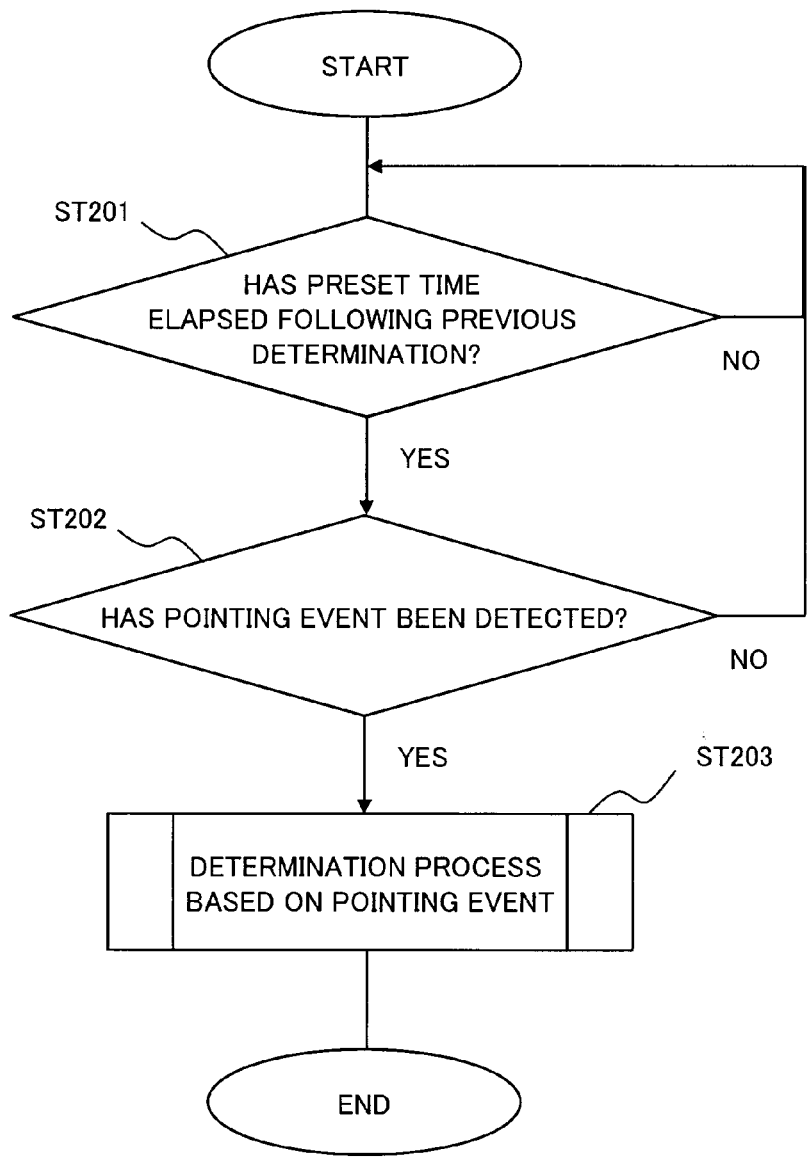
FIG. 2 is a flowchart illustrating a process of determining a function that operates in the client in accordance with the first exemplary embodiment of the present invention.

FIG. 2 is a flowchart illustrating an operation of detecting the kind of operation unit, for example, periodically, by the function detection unit 112 provided in the client 100, for the sake of the aforementioned switching. The function detection unit 112 determines whether, in the client 100, the tablet terminal function is operating or the notebook PC function is operating, on the basis of a pointing event. In other words, if it is calculated that the pointing device is a mouse, it is then determined that the notebook PC function is operating in the client 100. If it is calculated that the pointing device is a finger or a stylus pen, it is then determined that the tablet terminal function is operating in the client 100. Incidentally, the pointing event (pointing operation) is an event that is input to the client 100 via a pointing unit such as a mouse, a finger, or a stylus pen. The pointing event includes a mouse event, a tap event and a flick event accomplished by a finger or a stylus pen, and the like. Events include, besides the pointing events, key events (key operations) that include an input event performed via a keyboard, and the like.

The event management unit 111, for example, always, watch for an event that occurs in the client 100, and stores event information regarding the event that has occurred into the event information storage unit 116. FIG. 3 is a diagram indicating an example of the event information stored into the event information storage unit 116 by the event management unit 111. As indicated in FIG. 3, the event management unit 111 contains the occurrence time points of events, the types of events and event type-dependent data as event information. The event type-dependent data includes X locations and Y locations. The X locations and the Y locations represent the values that each corresponds to the X coordinate values and the Y coordinate values when the two edge sides of a display screen (display unit) that is not illustrated in the drawings are assumed as being an X-axis and a Y-axis.

As illustrated in FIG. 2, the function detection unit 112 checks whether a predetermined amount of time has elapsed following the previous determination mentioned above (step ST201). After carrying out the foregoing determination, the function detection unit 112 retains the time point of the determination. The function detection unit 112, after determining that the predetermined amount of time has elapsed following the previous determination mentioned above, checks whether a pointing event has been detected following the previous determination (step ST202).

In other words, the function detection unit 112 checks whether a pointing event has been detected following the previous determination, on the basis of the time point at which the previous determination mentioned above was performed and the time points included in the event information as indicated in FIG. 3.

If a pointing event, such as a mouse event or the like, has not been detected (NO in step ST202), the function detection unit 112 returns the process to step ST201.

If a pointing event is detected (YES in step ST202), the function detection unit 112 carries out a determination process based on the pointing event (step ST203).

Figure 4:
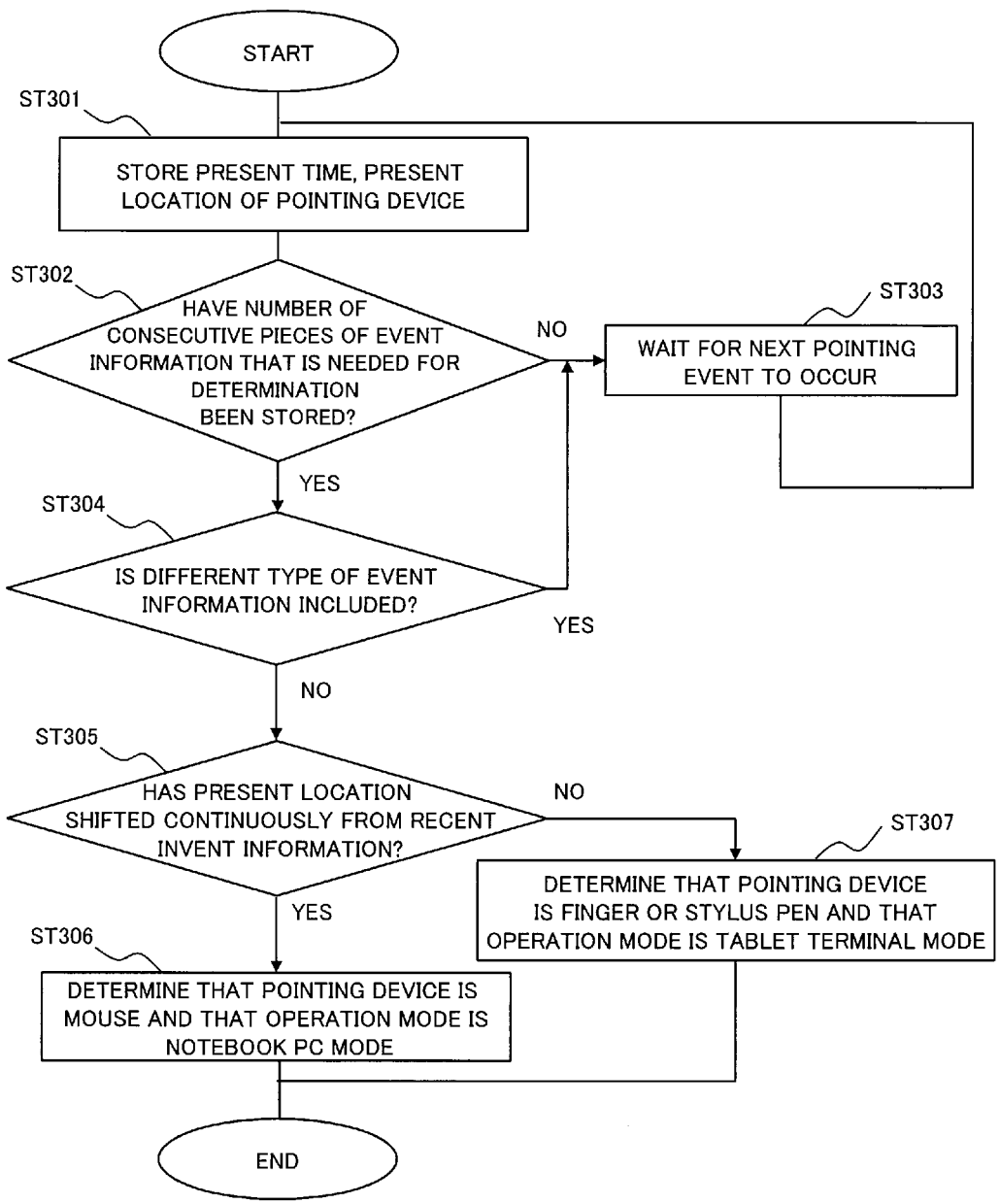
FIG. 4 is a flowchart illustrating an operation of a determination process performed by the client in accordance with the first exemplary embodiment of the present invention.

FIG. 4 is a flowchart illustrating details of the determination process (i.e., step ST203) which is performed by the function detection unit 112 illustrated in FIG. 2. With reference to FIG. 4, the determination process performed by the function detection unit 112 will be described. In the description below, as in the cases of typical graphical user interface (GUI) applications, the wait for a pointing event is assumed to be not a wait that is carried out in a fixed manner by stopping other events but a wait for events that also include other events such as a key event and the like.

The function detection unit 112 stores the present location indicated by the pointing device and the present time point into the event information storage unit 116 (step ST301). The function detection unit 112 determines the function that is operating in the client 100, on the basis of the track exhibited by the pointing device. To that end, the function detection unit 112 determines whether a sufficient number (quantity) of consecutive pieces of event information for determination about the track have been stored (step ST302). Whether the aforementioned sufficient number of consecutive pieces of event information are stored is determined on the basis of whether at least a predetermined number of events have occurred within a predetermined time.

When the aforementioned sufficient number of consecutive pieces of event information are not stored (NO in step ST302), the function detection unit 112 waits for the next occurrence of an event to be brought about via the pointing device (step ST303). If an event occurs, the function detection unit 112 returns the process to step ST301.

On the other hand, when the aforementioned sufficient number of consecutive pieces of event information are stored (YES in step ST302), the function detection unit 112 checks whether the aforementioned sufficient number of pieces of event information include information about any event other than the pointing events (e.g., about a key event or the like) (step ST304).

If the sufficient number of pieces of event information include information about an event other than the pointing events (YES in step ST304), the function detection unit 112 waits for the next occurrence of an event to be brought about via the pointing device (step ST303). If such an event occurs, the function detection unit 112 returns the process to step ST301.

If the sufficient number of pieces of event information do not include information about any event other than the pointing events (NO in step ST304), the function detection unit 112 checks whether the pointing device has continuously moved, on the basis of the present location of the pointing device and the location of the event at the recent time point contained in the event information (step ST305). It is determined that the pointing device is moving continuously, for example, by tracing the previous locations indicated by the pointing device and checking at each location that the moving distance per unit time over the distance from the location at the immediately preceding time point (i.e., the average speed) does not considerably deviate.

Alternatively, the function detection unit 112 may connect the previous locations indicated by the pointing device by a spline approximation curve and may determine that the pointing device is continuously moving if the spline approximation curve that connects the locations is a smooth curve.

Figure 5:
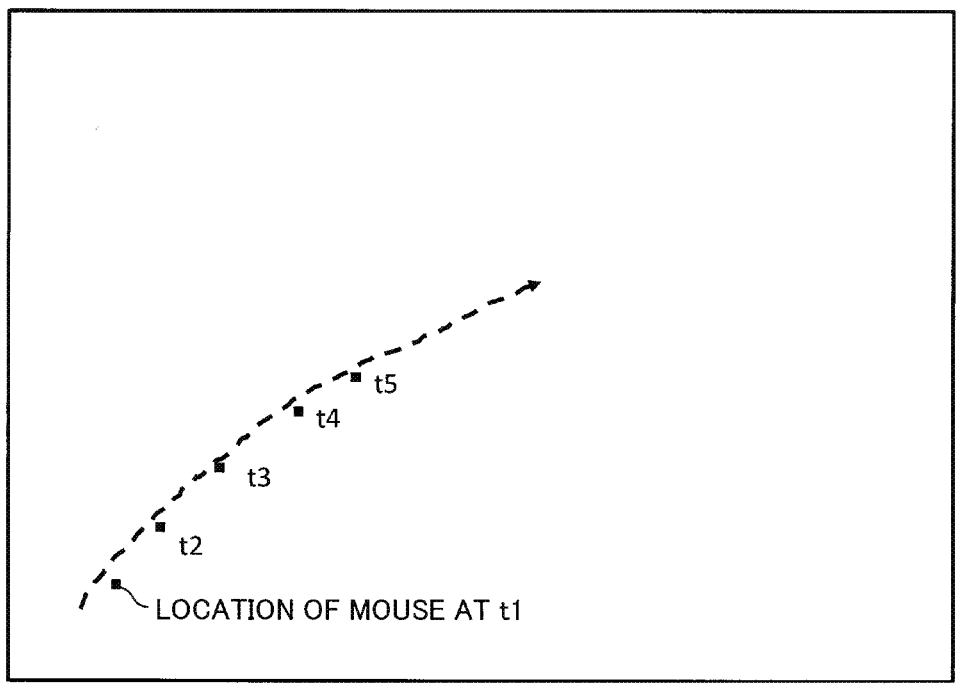
FIG. 5 is a diagram illustrating an example in which the location indicated by a pointing device continuously moves in the client in accordance with the first exemplary embodiment of the present invention.
Figure 6:
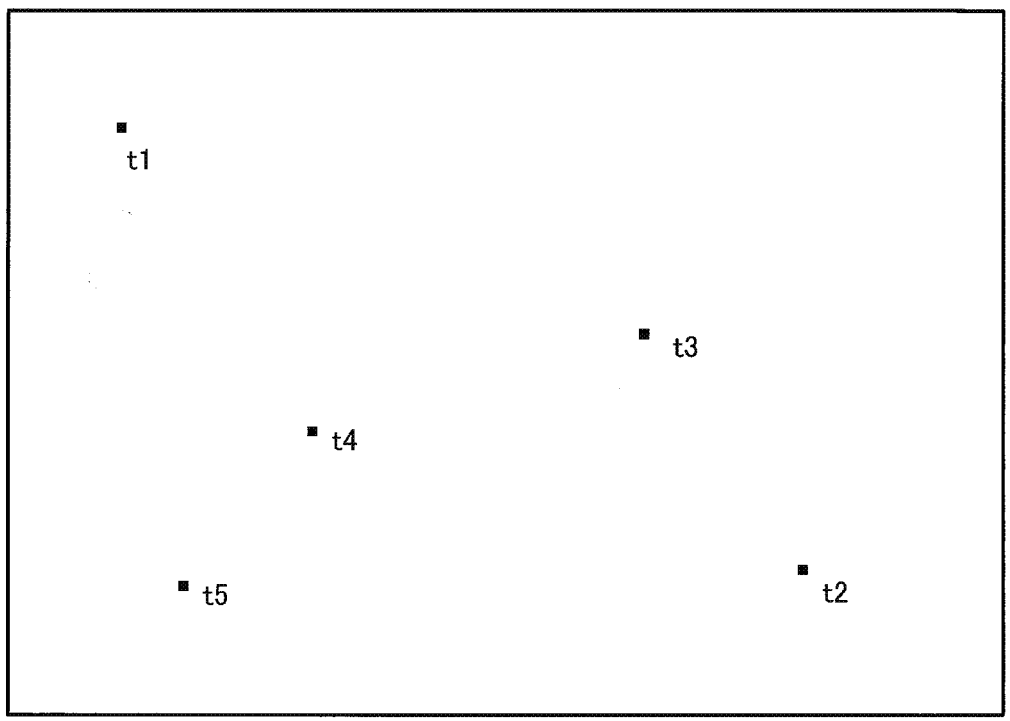
FIG. 6 is a diagram illustrating an example in which the location indicated by the pointing device does not continuously move in the client in accordance with the first exemplary embodiment of the present invention.

FIG. 5 is a diagram illustrating an example of the case where the location that the pointing device indicates moves continuously. FIG. 6 is a diagram illustrating an example of the case where the location that the pointing device indicates does not move continuously. FIG. 5 depicts the locations of the mouse at time points t1 to t5 in the case where a user has moved the mouse without clicking. FIG. 6 depicts the locations of a user's finger at time points t1 to t5.

As a result of the above-described checking, when the function detection unit 112 determines that the location indicated by the pointing device moves continuously, the function detection unit 112 then calculates that the pointing device is a mouse, and determines that the notebook PC function is operating in the client 100 (step ST306). On the other hand, if the function detection unit 112 determines that the location indicated by the pointing device does not move continuously, the function detection unit 112 then calculates that the pointing device is a finger or a stylus pen, and determines that the tablet terminal function is operating in the client 100 (step ST307). The function detection unit 112 retains the result of the determination.

Next, the conversion of screen components will be described.

The screen components are components (GUI objects) displayed in the screen, and include, for example, combo boxes, buttons, check boxes, and the like. Each of the components varies in terms of the configuration in which to appropriately display the function of the component between when the component is displayed in a display unit that operates in the client 100 in which the tablet terminal function is operating and when the component is displayed in the display unit that operates in the client 100 in which the notebook PC function is operating. Therefore, the client 100 converts the configurations in which to display the screen components at the timing at which the operation mode is switched.

The location determination unit 113 determines the location at which to start the aforementioned conversion in the display screen. This is because it is highly likely that after the operation mode is switched, the operation will be continued at the location in the client 100 at which the operation is being performed before the operation mode is switched. In other words, the aforementioned conversion is started with the component displayed at the aforementioned location, and the displaying of the components in the post-switch operation mode is begun with that component, so that the user can operate the client 100 immediately after the switch in operation mode as well.

The screen component conversion unit 114 starts the conversion at the location determined as described above. First, an operation of the location determination unit 113 will be described.

Figure 7:
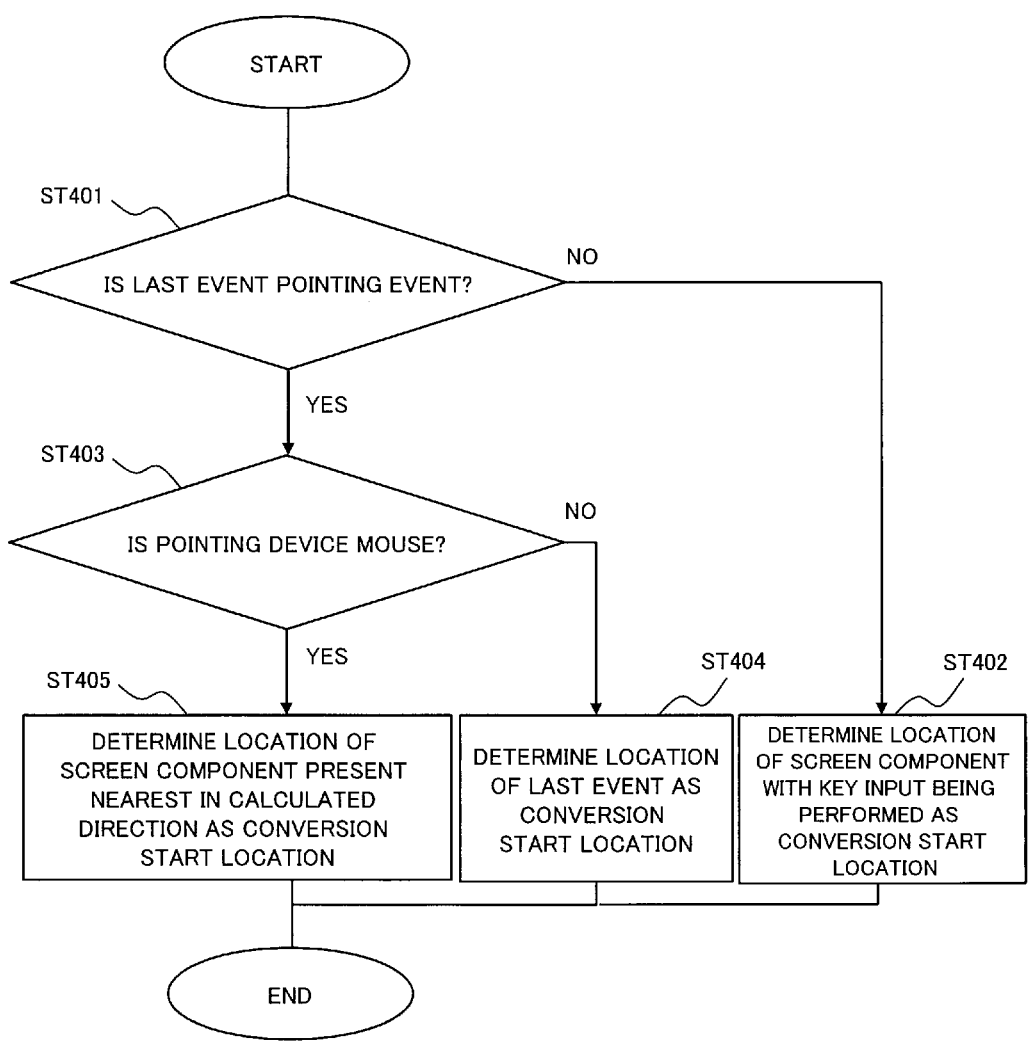
FIG. 7 is a flowchart illustrating an operation of determining a location to start converting screen components which is performed by the client in accordance with the first exemplary embodiment of the present invention.
Figure 8:
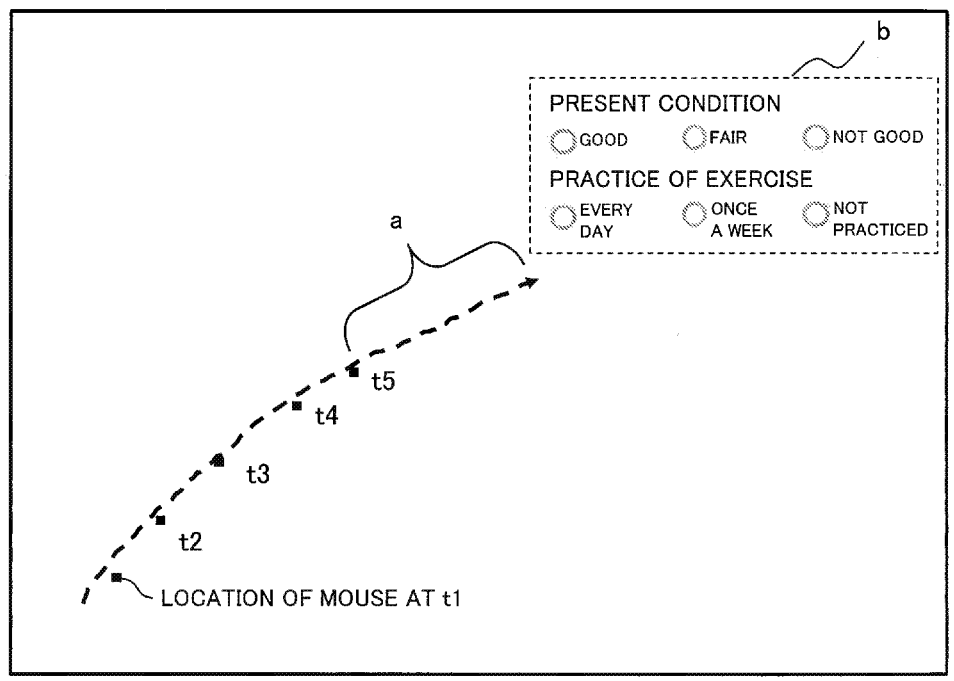
FIG. 8 is a diagram illustrating the positional relationship between a screen component and a track of a pointing device in the client in accordance with the first exemplary embodiment of the present invention.

FIG. 7 is a flowchart illustrating an operation performed by the location determination unit 113 to determine the location to start converting screen components. FIG. 8 is a diagram illustrating the positional relationship between a track of the pointing device and a screen component. With reference to FIG. 7 and FIG. 8, an operation performed by the location determination unit 113 to determine the conversion start location for screen components will be described.

The user switches the operation mode of the client 100 by, for example, detaching or folding the liquid crystal screen of the client 100, or changing the operation unit from the mouse to fingers and tapping the screen with the fingers.

In response to the switch of the operation mode of the client 100 caused by the user performing the aforementioned operation, the location determination unit 113 determines the location at which to start the conversion regarding the screen components described above.

As illustrated in FIG. 7, the location determination unit 113 determines whether the last event which occurred prior to the operation mode switching was a pointing event, on the basis of the event information stored in the event information storage unit 116 (step ST401). When the last event was not a pointing event (NO in step ST401), the location determination unit 113 regards the last event as being a key event, and determines that the key input is focused on, i.e., determines the location of the screen component that the key input concerns as the conversion start location (step ST402).

On the other hand, when the last event was a pointing event (YES in step ST401), the location determination unit 113 determines whether the kind of the pointing device is a mouse (step ST403). The location determination unit 113 refers to the kind of the pointing device that the function detection unit 112 has determined, as illustrated above with reference to FIG. 4. When the kind of the pointing device is not a mouse (NO in step ST403), the function detection unit 112 calculates that the pointing device is a finger or a stylus pen, and determines the location of the last event as the conversion start location (step ST404).

On the other hand, if the location determination unit 113 determines the kind of the pointing device as being a mouse (YES in step ST403), the location determination unit 113 then reads out from the event information storage unit 116 event information regarding the mouse event that occurred at a recent time point, and calculates (estimates) the moving direction of the mouse. Then, the location determination unit 113 determines the location of the screen component that exists the nearest in the calculated direction as the conversion start location (step ST405).

For example, as illustrated in FIG. 8, the location determination unit 113 calculates (estimates) the direction of the further movement of the mouse as indicated by "a" on the basis of the locations of the mouse indicated by t1 to t5. Then, the location determination unit 113 determines the location of the screen component b that exists the nearest in that direction as the conversion start location.

Figure 9:
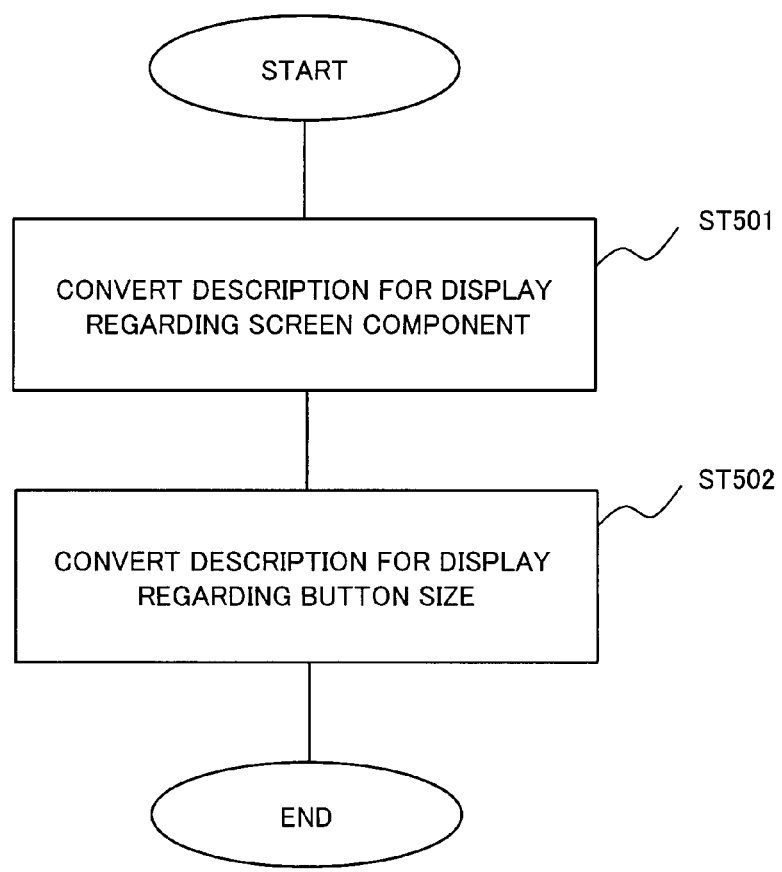
FIG. 9 is a flowchart illustrating a conversion process for screen components performed by the client in accordance with the first exemplary embodiment of the present invention.

Next, an operation performed by the screen component conversion unit 114 to convert screen components will be described. FIG. 9 is a flowchart illustrating the conversion process that the screen component conversion unit 114 performs on screen components.

After the location determination unit 113 determines the conversion start location as described above, the screen component conversion unit 114 converts the description regarding a screen component displayed at or near the determined conversion start location (step ST501). In other words, the screen component conversion unit 114 converts the description regarding screen components (GUI objects) included in the HTML document which constitutes the present displayed screen, in accordance with the relations stated in the screen component relational table, so that the converted description is suitable to the post-switch function. Due to this operation, the display of screen components can be switched so as to be suitable to the function performed after the operation mode is switched.

FIG. 10 is a diagram presenting the screen component relational table stored in the screen component relational table storage unit 117. As indicated in FIG. 10, the screen component relational table storage unit 117 stores the screen component relational table in which descriptions regarding the screen components that are displayed in a display unit that operates by the notebook PC function and descriptions regarding the screen components that are displayed in a display unit that operates by the tablet terminal function are related to each other.

When the HTML document includes a GUI object that is mentioned in the screen component relational table, the screen component conversion unit 114 converts the description regarding that GUI object from the description for the tablet terminal into the description for the notebook PC (or the other way around). Note that the HTML document acquired from the web server 200 is stored in a storage unit (not illustrated) that the client 100 has.

Subsequently, the screen component conversion unit 114 performs conversion regarding the size of software buttons (hereinafter, simply referred to as "buttons") of the GUI objects (step ST502). FIG. 11 is a diagram presenting a button size relational table stored in the button size relational table storage unit 118. As illustrated in FIG. 11, the button size relational table storage unit 118 stores the button size relational table in which the sizes of buttons when the buttons are displayed in the display unit that operates by the notebook PC function and the sizes of buttons when the buttons are displayed in the display unit that operates by the tablet terminal function are related to each other.

Thus, when displaying the buttons, in some cases, the size of a button varies between when the button is displayed in the display unit that operates by the tablet terminal function and when the button is displayed in the display unit that operates by the notebook PC function. Therefore, when the HTML document includes a description regarding a button, the screen component conversion unit 114 converts the size of the button from the size for the tablet terminal into the size for the notebook PC (or the other way around).

Figure 12:
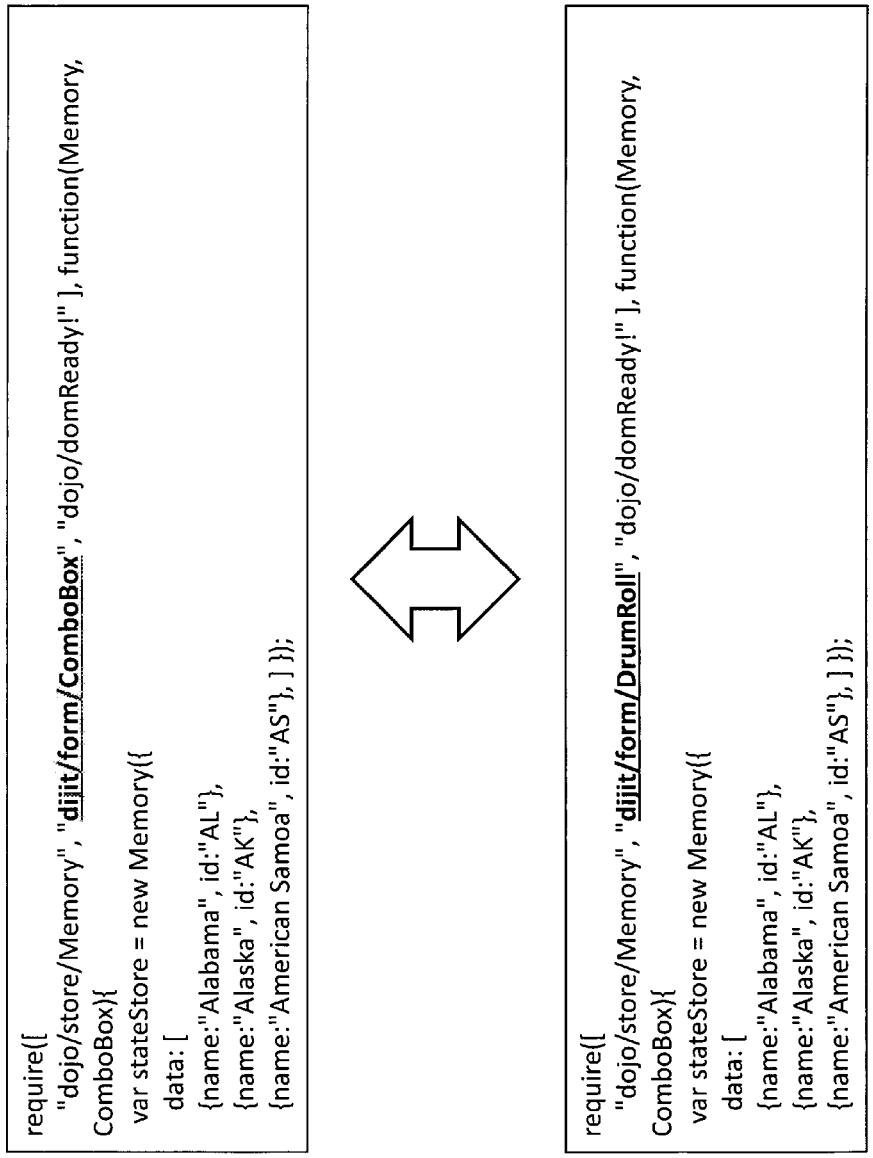
FIG. 12 is a diagram illustrating an example of code conversion performed by the client in accordance with the first exemplary embodiment of the present invention.
Figure 13:
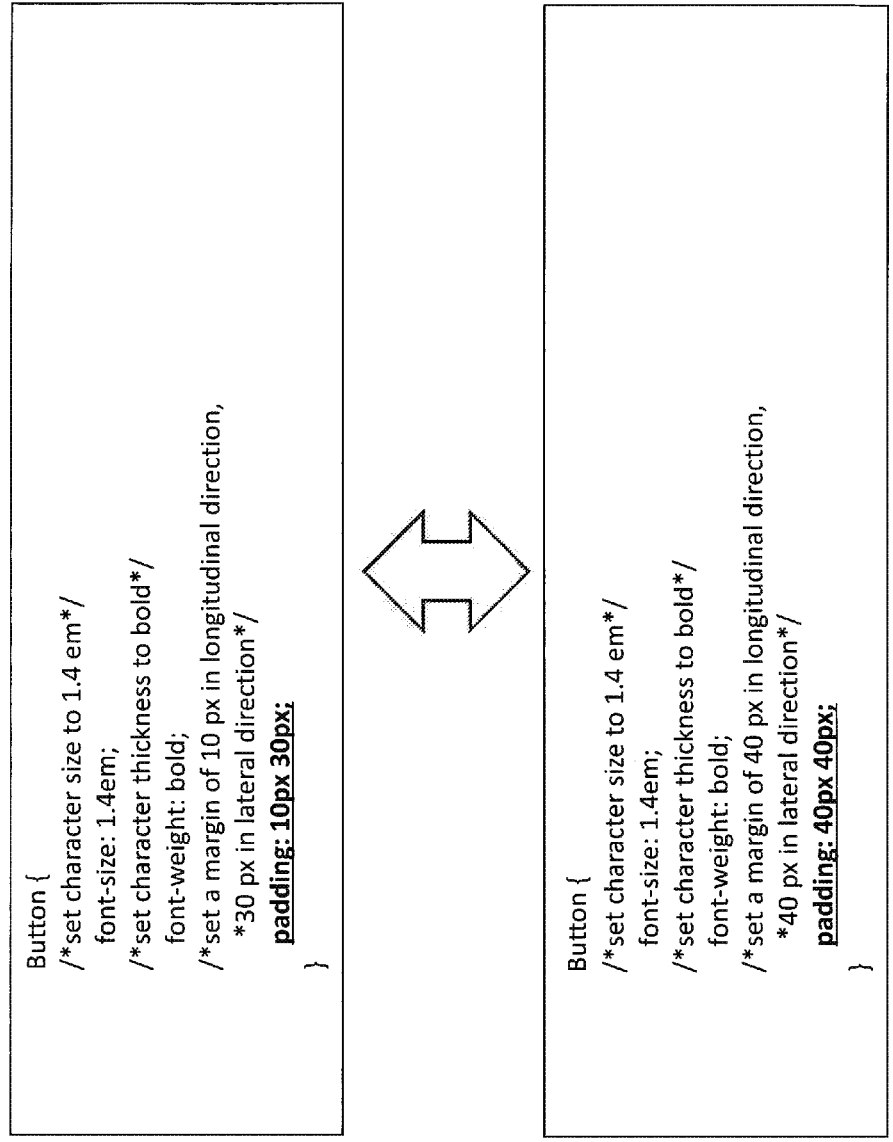
FIG. 13 is a diagram illustrating another example of the code conversion performed by the client in accordance with the first exemplary embodiment of the present invention.

FIG. 12 is a diagram presenting an example of the conversion of a description (code) which is performed by the screen component conversion unit 114 when a GUI object is packaged by "Dojo", which is a JavaScript framework. Furthermore, FIG. 13 is a diagram presenting an example of the conversion of a description (code) regarding a button when the button is packaged with a Cascaded Style Sheet (CSS). As described above, the screen component conversion unit 114 converts the description regarding the screen component.

After the description regarding the screen component is converted as mentioned above, the drawing unit 115 displays, on the basis of the post-conversion description, the screen component in the display unit that operates in the client 100 in the post-switch operation mode, starting at the location determined by the location determination unit 113.

Thus, according to the first exemplary embodiment, the client 100 determines the operation mode (function) on the basis of the kind of the pointing device, by using the function detection unit 112. Then, the screen component conversion unit 114 converts the descriptions regarding the screen components included in the HTML document into descriptions suitable for the post-switch operation mode, in accordance with the switching of the operation mode. By adopting this construction, the first exemplary embodiment achieves an advantageous effect of being able to produce a screen display suitable for both the notebook PC function and the tablet terminal function in a hybrid notebook PC, in accordance with the switching between the notebook PC function and the tablet terminal function.

Furthermore, according to the first exemplary embodiment, the HTML document for producing a screen display after the operation mode is switched is obtained not by re-creating the HTML document but by converting the descriptions regarding the screen components. Therefore, according to the first exemplary embodiment, since it becomes possible to switch the screen display by using a single document, an advantageous effect of being able to reduce the time between the switching of the operation mode and the display of the post-switch screen is obtained.

Furthermore, the location determination unit 113 calculates the location of a screen component that the user desires to operate after the operation mode is switched, and the screen component conversion unit 114 starts conversion of the description regarding the screen component displayed at or near the calculated location. Due to this construction, the first exemplary embodiment makes it possible to display in a short time the screen component that it is calculated that the user desires to operate after the switching. Therefore, the user can start operating immediately after the switch in operation mode, and an advantageous effect of further improvement in operability is obtained.

Second Exemplary Embodiment

Next, a second exemplary embodiment based on the above-described first exemplary embodiment will be described. In the following description, constructions and operations similar to those of the first exemplary embodiment will be denoted by the same reference numerals, and will not be redundantly described. A client 100 according to the second exemplary embodiment of the present invention has a function of determining a device on the basis of key events in addition to the functions of the client 100 according to the first exemplary embodiment.

Figure 14:
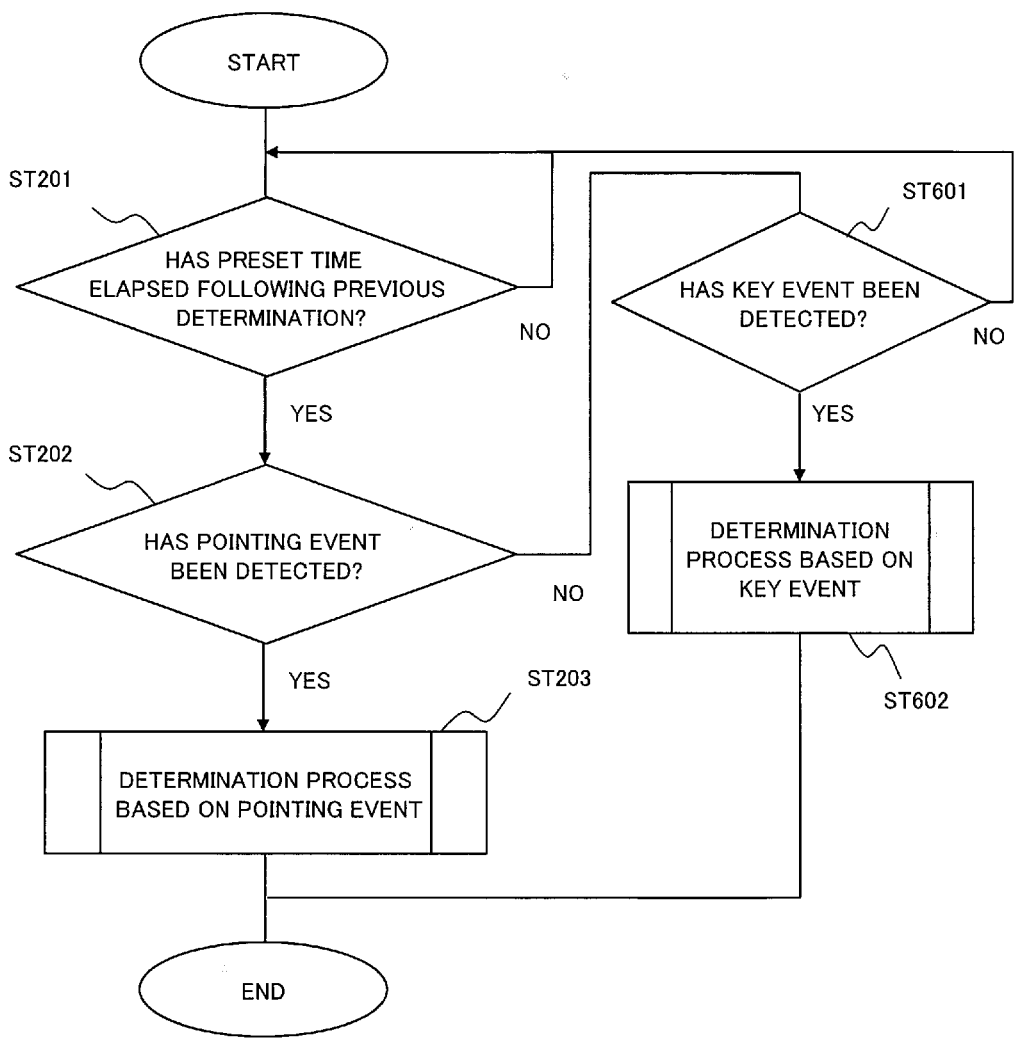
FIG. 14 is a flowchart illustrating a determination process performed by a client in accordance with a second exemplary embodiment of the present invention.

FIG. 14 is a flowchart illustrating a determination process performed by the client 100 according to the second exemplary embodiment of the present invention. The determination process in FIG. 14 illustrates an operation in which step ST601 and step ST602 have been added to the flowchart in FIG. 2 described above in conjunction with the first exemplary embodiment.

In other words, the function detection unit 112 of the client 100 according to the second exemplary embodiment determines which one of the tablet terminal function or the notebook PC function is operating in the client 100, by identifying key events as well as pointing events.

The client 100, using the function detection unit 112, carries out step ST201 and step ST202 described above in conjunction with the first exemplary embodiment. When it is determined in step ST202 that a pointing event has not been detected, the function detection unit 112 then determines whether a key event has been detected (step ST601) on the basis of event information stored in the event information storage unit 116. When a key event is not detected, the function detection unit 112 returns the process to step ST201.

On the other hand, when a key event is detected, the function detection unit 112 carries out a determination process regarding a device on the basis of the key event (step ST602).

Figure 15:
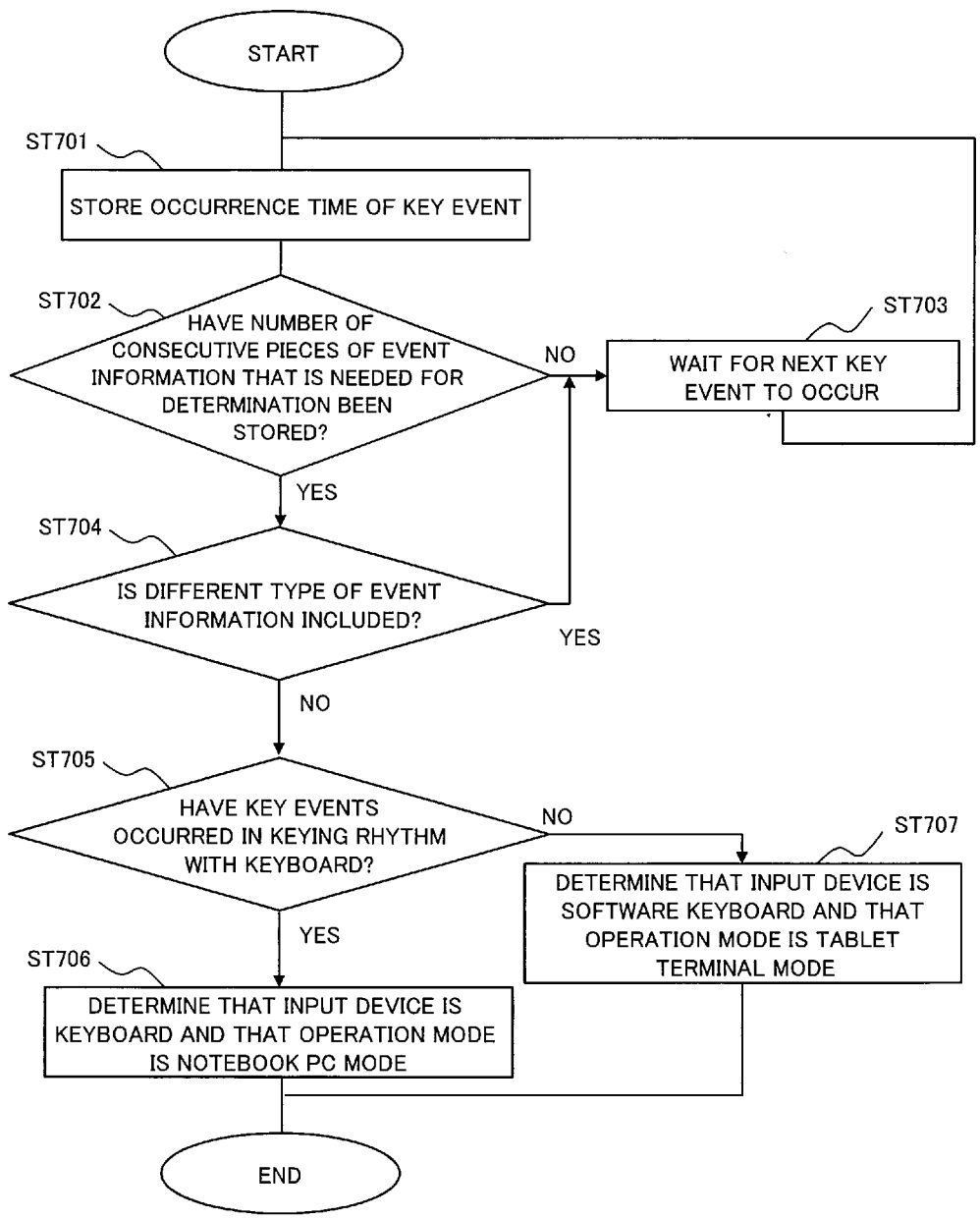
FIG. 15 is a flowchart illustrating an operation of the determination process performed by the client in accordance with the second exemplary embodiment of the present invention.

FIG. 15 is a flowchart illustrating details of the determination process (i.e., step ST602) performed by the function detection unit 112 in FIG. 14 on the basis of the key event. With reference to FIG. 15, the determination process performed by the function detection unit 112 on the basis of the key event will be described. In the description below, as in the cases of typical graphical user interface (GUI) applications, the wait for a key event is assumed to be not a wait that is carried out in a fixed manner by stopping other processes but a wait for processes and events that also include other events such as a pointing event and the like.

In response to occurrence of the key event, the function detection unit 112 stores the occurrence time point into the event information storage unit 116 (step ST701). FIG. 16 is a diagram indicating event information stored in the event information storage unit 116 by the event management unit 111. As indicated in FIG. 16, the function detection unit 112 stores the event information that includes the occurrence time point, the type of event (key event), and event type-dependent data into the event information storage unit 116. When the type of event is a key event, the event information does not include event type-dependent data.

The function detection unit 112 determines whether the input device is a keyboard (i.e., the operation mode is the notebook PC mode) or a software keyboard (i.e., the operation mode is the tablet terminal mode) on the basis of the keying rhythm of the key input (i.e., input operation based on the user's key typing).

To that end, the function detection unit 112 determines whether a number of consecutive pieces of event information needed to determine the input device by the keying rhythm are stored in the event information storage unit 116 (step ST702). Whether the aforementioned needed number of consecutive pieces of event information are stored is determined on the basis of whether at least a predetermined number of events have occurred within a predetermined length of time.

If the aforementioned needed number of consecutive pieces of event information are not stored (NO in step ST702), the function detection unit 112 waits for the next occurrence of a key event (step ST703). If a key event occurs, the function detection unit 112 returns the process to step ST701.

On the other hand, if the aforementioned needed number of consecutive pieces of event information are stored (YES in step ST702), the function detection unit 112 checks whether the aforementioned needed number of pieces of event information include information about an event other than the key event (e.g., a pointing event or the like) (step ST704).

If information about an event other than the key event is included (YES in step ST704), the function detection unit 112 waits for the next occurrence of a key event performed by the key device (step ST703). When a key event occurs, the function detection unit 112 returns the process to step ST701.

If information about an event other than the key event is not included (NO in step ST704), the function detection unit 112 checks whether key events are occurring in the keying rhythm with a keyboard (which will be detailed later) (step ST705). If key events are occurring in the keyboard keying rhythm, the function detection unit 112 calculates that the operation unit is a keyboard, and determines that the notebook PC function is operating in the client 100 (step ST706). If key events are not occurring in the keyboard keying rhythm, the function detection unit 112 calculates that the operation unit is a software keyboard, and determines that the tablet terminal function is operating in the client 100 (step ST707).

Figure 17:
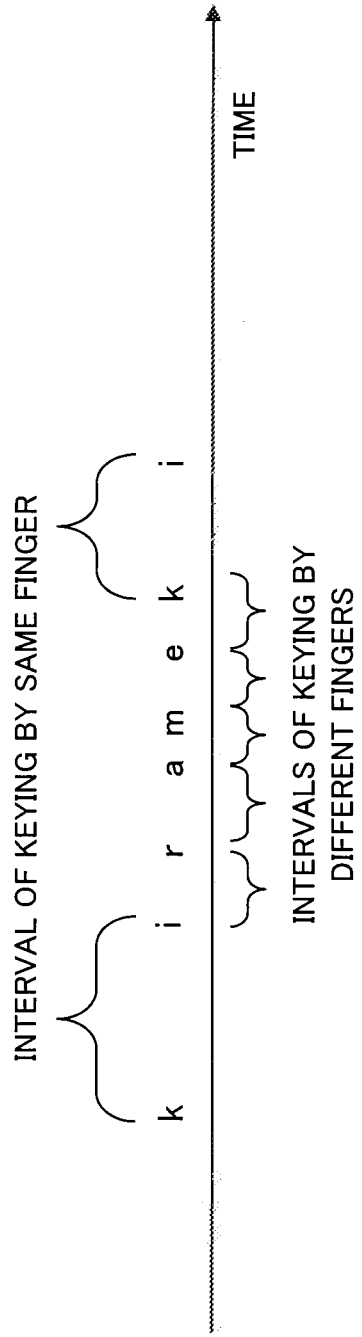
FIG. 17 is a diagram illustrating a keying rhythm with a keyboard.

FIG. 17 is a diagram illustrating the keying rhythm with a keyboard. FIG. 17 indicates time gaps that occur when a user types in a string of characters of "kirameki" with both hands on a QWERTY keyboard. As indicated in FIG. 17, the keying interval between "k" and "i" is longer than the keying interval between "i" and "r". This is because when a QWERTY keyboard is used, "k" and "i" are keyed in by the same finger and "i" and "r" are keyed in by different fingers that are movable in parallel.

Figure 18:
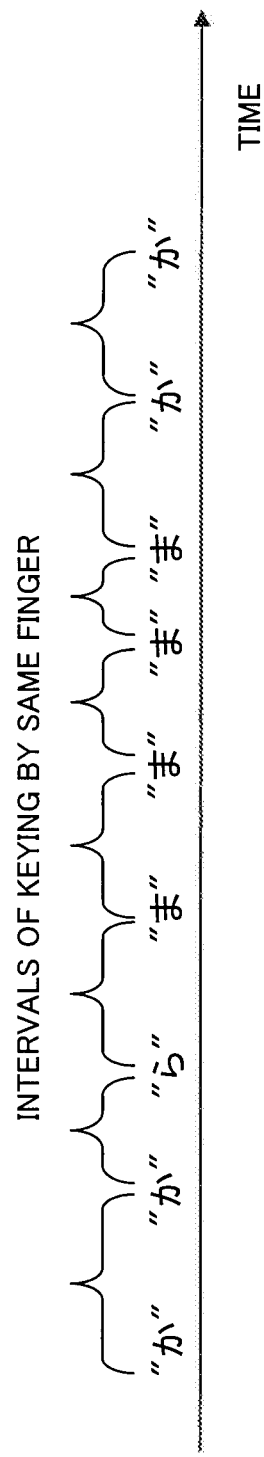
FIG. 18 is a diagram illustrating a keying rhythm with a software keyboard.
Figure 19:
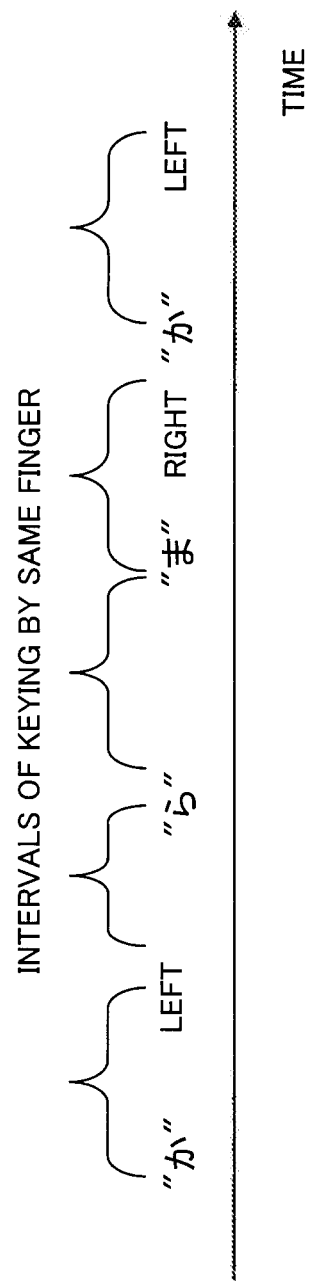
FIG. 19 is a diagram illustrating a flick input method.

FIG. 18 and FIG. 19 are diagrams illustrating the keying rhythm when a Japanese word "きらめき" (kirameki) is keyed in via a device other than a keyboard (i.e., via a software keyboard). FIG. 18 illustrates a method in which a user can input a Japanese hiragana character by pressing one of keys each provided with one of hiragana characters in the a-row of Japanese syllabary (the Japanese hiragana characters that appear in the a-row in the Japanese syllabary and each stand for a syllable with the vowel "あ"(a)) displayed on the screen once or a plurality of times. For example, if a key provided with an a-row hiragana is pressed twice, the i-row hiragana (one of the hiraganas that appear in the i-row in the Japanese syllabary and each stands for a syllable with the vowel "い"(i)) is input. Furthermore, if a key provided with an a-row hiragana is pressed three times, the u-row hiragana (one of the hiraganas that appear in the u-row in the Japanese syllabary and each stands for a syllable with the vowel "う"(u)) is input.

In the example in FIG. 18, the user presses the key provided with the character "か" (ka) twice to input the character "き" (ki), presses the key provided with the character "ら" (ra) once to input the character "ら" (ra), presses the key provided with the character "ま" (ma) four times to input the character "め" (me), and presses the key provided with the character "か" (ka) twice to input the character "き" (ki). In this input method, inputs are often performed by using the same finger, and are less frequently performed by using a plurality of fingers, so that short keying intervals are less likely to occur, and a large difference between key intervals is less likely to occur. Furthermore, it is also a feature of this input method that the repeated pressing of the same character-provided key frequently occurs.

FIG. 19 is a diagram illustrating a flick input method. The flick input method is a method in which a user inputs, for example, a hiragana character by touching, with a finger, an a-row hiragana character presented and then flicking the finger upward, downward, leftward, or rightward (flick action). If the flicking direction is leftward, an i-row hiragana character is input. If the flicking direction is upward, an u-row hiragana character is input. If the flicking direction is rightward, an e-row hiragana character is input. If the flicking direction is downward, an o-row hiragana character is input. As illustrated in FIG. 19, in the flick input method, the a-row characters are input by one input of action of a finger, and the other characters are input by two inputs of action of the same finger that includes a flick action. In other words, two input patterns that are "one input" and "one input plus one flick action" are frequently detected.

The function detection unit 112 reads event information regarding key events (i.e., the key locations, the occurrence time points, and the like) from the event information storage unit 116, and calculates whether key events are occurring in the keyboard keying rhythm as mentioned above.

The function detection unit 112 calculates the intervals between the occurrence time points of the events having occurred in the recent period on the basis of the event information stored in the event information storage unit 116, and compares the differences between the occurrence time points of adjacent events with the aforementioned keying rhythm. As a result, when there have been key events occurring in the same or substantially the same rhythm as one of the aforementioned keying rhythms, the function detection unit 112 determines that the key events have been brought about via the keyboard or the software keyboard that causes the same or substantially the same rhythm as the keying rhythm of those key events. Furthermore, when there has been no event occurring in the same or substantially the same rhythm as any one of the aforementioned keying rhythms, the function detection unit 112 may return the process to the step ST701, or may also stop calculating what the present input device is on the basis of key events.

When it is calculated whether the operation unit is a keyboard or a software keyboard on the basis of the method of key input as described above, a false determination that the key input is being carried out via the software keyboard can easily be made if the user operates a QWERTY keyboard with one finger, for example. In order to prevent such a false determination, as mentioned above, whether the operation unit is a keyboard or a software keyboard may be determined on the basis of a combination of determination based on the track exhibited by the pointing device and determination based on the key input method mentioned above, for example. Alternatively, the client 100 may also receive, from the user, information that indicates whether the tablet terminal function is operating in the client 100 or the notebook PC function is operating in the client 100. Furthermore, the determination regarding the input device may be accurately performed by combining the foregoing determinations.

Thus, according to the second exemplary embodiment, the function detection unit 112 determines the kind of the input device by calculating the keying rhythm on the basis of key events. Due to this construction, the second exemplary embodiment achieves, in addition to the advantageous effects of the first exemplary embodiment mentioned above, an advantageous effect of being able to switch to a screen display suitable for the tablet terminal or for the notebook PC by a single content even when the user is performing keyboard inputting.

Third Exemplary Embodiment

Figure 20:
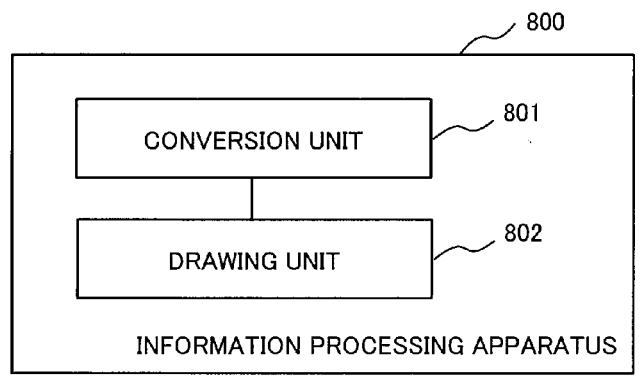
FIG. 20 is a diagram illustrating an overall construction of an information processing apparatus in accordance with a third exemplary embodiment of the present invention.

FIG. 20 is a block diagram illustrating a construction of an information processing apparatus 800 according to a third exemplary embodiment of the present invention. The information processing apparatus (client) 800 includes a conversion unit 801 and a drawing unit 802.

When it is detected that the operation mode has been switched from an operation performed by a first function of detecting an operation performed by a first operation unit to an operation performed by a second function of detecting an operation performed by the second operation unit, the conversion unit 801 converts a description regarding an operation object associated with the first operation unit in a description for display in a display unit that operates by the first function into a description regarding the operation object associated with the second operation unit. The drawing unit 802 displays the description obtained by the conversion performed by the conversion unit 801 in the display unit that operates by the second function.

The conversion unit 801 relates to the screen component conversion unit 114 described above in conjunction with the first exemplary embodiment. Furthermore, the first operation unit or the second operation unit relates to the mouse or the fingers (stylus pen) described above in conjunction with the first exemplary embodiment.

Due to adoption of the foregoing construction, the third exemplary embodiment is able to display the operation object according to the kind of the operation unit, and therefor achieves an advantageous effect of being able to display the operation object while performing an operation mode switch according to the operation unit that operates by the function that is in operation.

Figure 21:
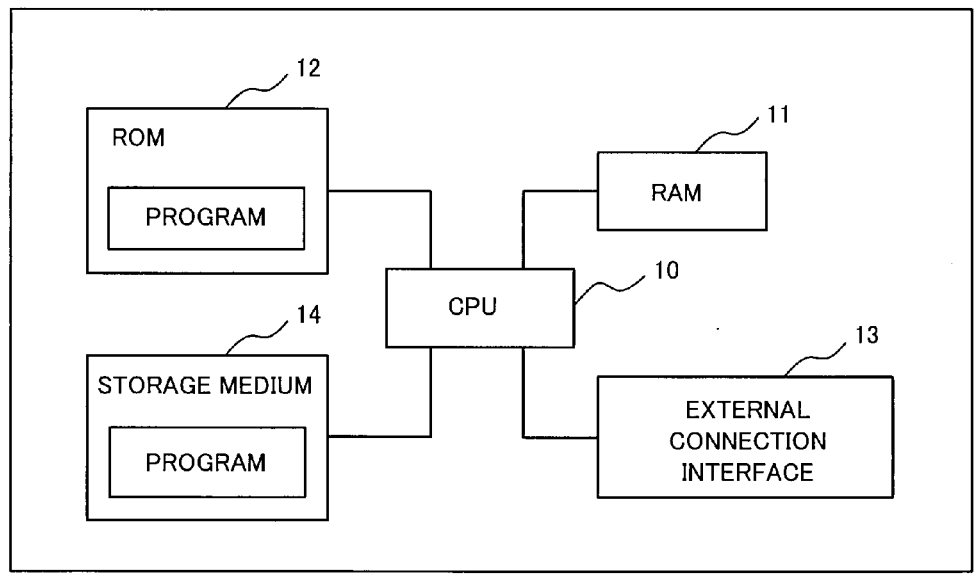
FIG. 21 is a diagram illustrating an example of a hardware construction of an apparatus that can realize the information processing apparatuses in accordance with various exemplary embodiments of the present invention.

The various units of the information processing apparatus illustrated in FIG. 1 and FIG. 20 are realized by hardware resources depicted as examples in FIG. 21. Specifically, the construction illustrated in FIG. 21 includes a central processing unit (CPU) 10, a random access memory (RAM) 11, a read only memory (ROM) 12, an external connection interface 13, and a storage medium 14. The CPU 10 controls overall operations of the information processing apparatus by reading onto the RAM 11 various software programs (computer programs) stored in the ROM 12 or the storage medium 14 and executing the various software programs. In other words, in the foregoing exemplary embodiments, the CPU 10 executes software programs that perform various functions (various units) that the information processing apparatus has, while referring to the ROM 12 or the storage medium 14 as appropriate.

In the above-described exemplary embodiments, the case where the functions in the information processing apparatus that are indicated in blocks in each of FIG. 1 and FIG. 20 are realized by software programs, as an example executed by the CPU 10 indicated in FIG. 21, is described. However, the functions indicated in each of the blocks in FIG. 1 and FIG. 20 may also be partly or entirely realized as hardware functions.

The present invention described with reference to the exemplary embodiments as examples is achieved by supplying an information processing apparatus with computer programs that can realize the foregoing functions and then by the CPU 10 reading the computer programs onto the RAM 11 and executing the computer programs.

It suffices that the above-described computer programs supplied are stored in a storage device readable by a computer, such as a readable/writable memory (temporary storage medium) or a hard disk device. In such a case, the present invention can be understood as being constructed of codes that indicate the above-described computer programs or a storage medium in which the computer programs are stored.

INDUSTRIAL APPLICABILITY

The present invention is applicable to, for example, hybrid notebook PCs.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Further, it is noted that the inventor's intent is to retain all equivalents of the claimed invention even if the claims are amended during prosecution.

REFERENCE SIGNS LIST

10 CPU
11 RAM
12 ROM
13 External connection interface
14 Storage medium
100, 800 Information processing apparatus
111 Event management unit
112 Function detection unit
113 Location determination unit
114 Screen component conversion unit
115 Drawing unit
116 Event information storage unit
117 Screen component relational table storage unit
118 Button size relational table storage unit
150 Communication network
200 Web server
801 Conversion unit
802 Drawing unit

The invention claimed is:

1. An information processing apparatus comprising:
a conversion unit that, when a switch from an operation performed by a first function which detects an operation performed by a first operation unit to an operation performed by a second function which detects an operation performed by a second operation unit, converts a description regarding an operation object related to the first operation unit in at least one description to display on a display unit that operates by the first function into a description regarding the operation object related to the second operation unit; and
a drawing unit that displays the description obtained by conversion performed by the conversion unit on a display unit that operates by the second function.

2. The information processing apparatus according to claim 1, further comprising
a determination unit that detects the operation performed by at least either the first operation unit or the second operation unit and that, on the basis of a time point at which the operation is detected, determines which one of the first function which detects the operation performed by the first operation unit or the second function which detects the operation performed by the second operation unit is operating.

3. The information processing apparatus according to claim 2, further comprising
a determination unit that determines the description regarding the operation object with which the conversion unit starts the conversion, on the basis of a location indicated on the display unit related to the operation performed by the first operation unit or the second operation unit.

4. The information processing apparatus according to claim 2, wherein
the determination unit, when detecting a pointing operation as the operation, determines which one of the first function which detects the operation performed by the first operation unit or the second function which detects the operation performed by the second operation unit is operating, on the basis of the time point of detection of the pointing operation and the location indicated on the display unit related to the pointing operation.

5. The information processing apparatus according claim 3, wherein
the determination unit determines that the description regarding the operation object displayed at the location detected at last time point on the display unit related to the operation performed by the first operation unit or the second operation unit is the description regarding the operation object with which the conversion unit starts the conversion.

6. The information processing apparatus according to claim 3, wherein
the determination unit determines that the description regarding the operation object displayed at the location calculated from the location on the display unit related to a plurality of operations performed by the first operation unit or the second operation unit is the description regarding the operation object with which the conversion unit starts the conversion.

7. The information processing apparatus according to claim 2, wherein
the determination unit, when detecting a key operation as the operation, determines which one of the first function which detects the operation performed by the first operation unit or the second function which detects the operation performed by the second operation unit is operating, on the basis of a character related to the key operation and an interval regarding the time point of detection of the key operation.

8. An information processing method comprising:
converting, when a switch from an operation performed by a first function which detects an operation performed by a first operation unit to an operation performed by a second function of detecting an operation performed by a second operation unit, a description regarding an operation object related to the first operation unit in at least one description to display on a display unit that operates by the first function into a description regarding the operation object related to the second operation unit; and
displaying the description obtained by the conversion on a display unit that operates by the second function.

9. The information processing method according to claim 8, wherein
when converting the description, detecting the operation performed by at least either the first operation unit or the second operation unit and, on the basis of a time point at which the operation is detected, determining which one of the first function which detects the operation performed by the first operation unit or the second function which detects the operation performed by the second operation unit is operating.

10. A non-transitory computer-readable storage medium storing a computer program that causes a computer to execute:
a process of converting, when a switch from an operation performed by a first function which detects an operation performed by a first operation unit to an operation performed by a second function of detecting an operation performed by a second operation unit, a description regarding an operation object related to the first operation unit in at least one description to display on a display unit that operates by the first function into a description regarding the operation object related to the second operation unit; and a process of displaying the description obtained by conversion on a display unit that operates by the second function.

* * * * *